US012752681B2

(12) United States Patent
Faruque et al.

(10) Patent No.: US 12,752,681 B2
(45) Date of Patent: Oct. 6, 2026

(54) DEPLOYABLE SEAT FRAME BRACE

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 18/624,428

(22) Filed: Apr. 2, 2024

(65) Prior Publication Data

US 2025/0303935 A1 Oct. 2, 2025

(51) Int. Cl.

*B60N 2/433* (2006.01)
*B60N 2/427* (2006.01)
*B60R 21/231* (2011.01)

(52) U.S. Cl.

CPC ........... *B60N 2/433* (2013.01); *B60N 2/4279* (2013.01); *B60R 21/231* (2013.01)

(58) Field of Classification Search

CPC .... B60N 2/433; B60N 2/427; B60N 2/42727; B60N 2/43; B60N 2/4279

See application file for complete search history.

(56) References Cited

U.S. PATENT DOCUMENTS

| | | | | | |
|---|---|---|---|---|---|
| 4,579,387 | A * | 4/1986 | Bell | B60N 2/433 | 297/378.11 |
| 5,366,268 | A * | 11/1994 | Miller | B60N 2/4228 | 297/216.13 |
| 8,123,293 | B2 * | 2/2012 | Marriott | B60N 2/4221 | 297/331 |
| 8,641,140 | B2 | 2/2014 | Swierczewski | | |
| 8,960,785 | B2 | 2/2015 | Kuno | | |
| 9,616,784 | B2 | 4/2017 | Nagayasu | | |
| 10,618,437 | B2 | 4/2020 | Fukawatase et al. | | |
| 10,689,118 | B2 | 6/2020 | Pierson-Moonan et al. | | |
| 2005/0179296 | A1 * | 8/2005 | Bruck | B60N 2/233 | 297/361.1 |
| 2013/0300165 | A1 * | 11/2013 | Fehring | B60N 2/427 | 180/274 |
| 2018/0208084 | A1 * | 7/2018 | Patel | B60N 2/42727 | |
| 2019/0112051 | A1 * | 4/2019 | Finlay | B64D 11/064 | |
| 2022/0097638 | A1 * | 3/2022 | Deng | B60N 2/79 | |

* cited by examiner

*Primary Examiner* — Joshua J Michener
*Assistant Examiner* — Colin Zohoori
(74) *Attorney, Agent, or Firm* — Frank A. MacKenzie; Brooks Kushman P.C.

(57) ABSTRACT

A seat system includes a seat bottom having a seat bottom frame and a seatback having a seatback frame pivotably supported by the seat bottom frame. The seat system also includes a seat frame brace movable between a stowed configuration and a deployed configuration. The seat frame brace includes a bottom link coupled to the seat bottom frame and a back link coupled to the seatback frame at a first end and coupled to the bottom link at a second end. An actuator is coupled to the seat frame brace and operative to move the seat frame brace from the stowed configuration to the deployed configuration.

16 Claims, 6 Drawing Sheets

DEPLOYABLE SEAT FRAME BRACE

BACKGROUND

A vehicle may include a seat and a seatbelt assembly. The seat can include a seatback and a seat bottom that can support an occupant of the seat. For example, the occupant of the seat may sit on a top surface of the seat bottom and recline against the seatback. The seatbelt assembly may include a seatbelt retractor and webbing retractably payable from the seatbelt retractor. The seatbelt assembly may include an anchor coupled to the webbing, and a latch plate that engages a buckle. The seatbelt assembly may be disposed adjacent to a seat of the vehicle. The webbing may extend continuously from the seatbelt retractor to the anchor. For example, one end of the webbing feeds into the seatbelt retractor, and the other end of the webbing is fixed to the anchor. The seat and the seatbelt assembly can work in conjunction to control occupant kinematics in the event of certain vehicle impacts. In some examples, the seatbelt assembly may be a seat integrated restraint (SIR) in which various components of the seatbelt assembly, e.g., the retractor, webbing guide, and/or the anchor, are carried by the seat. In some examples, this may allow the seat to be rotatable about a generally vertical axis to different facing positions.

DETAILED DESCRIPTION

Figure 1:
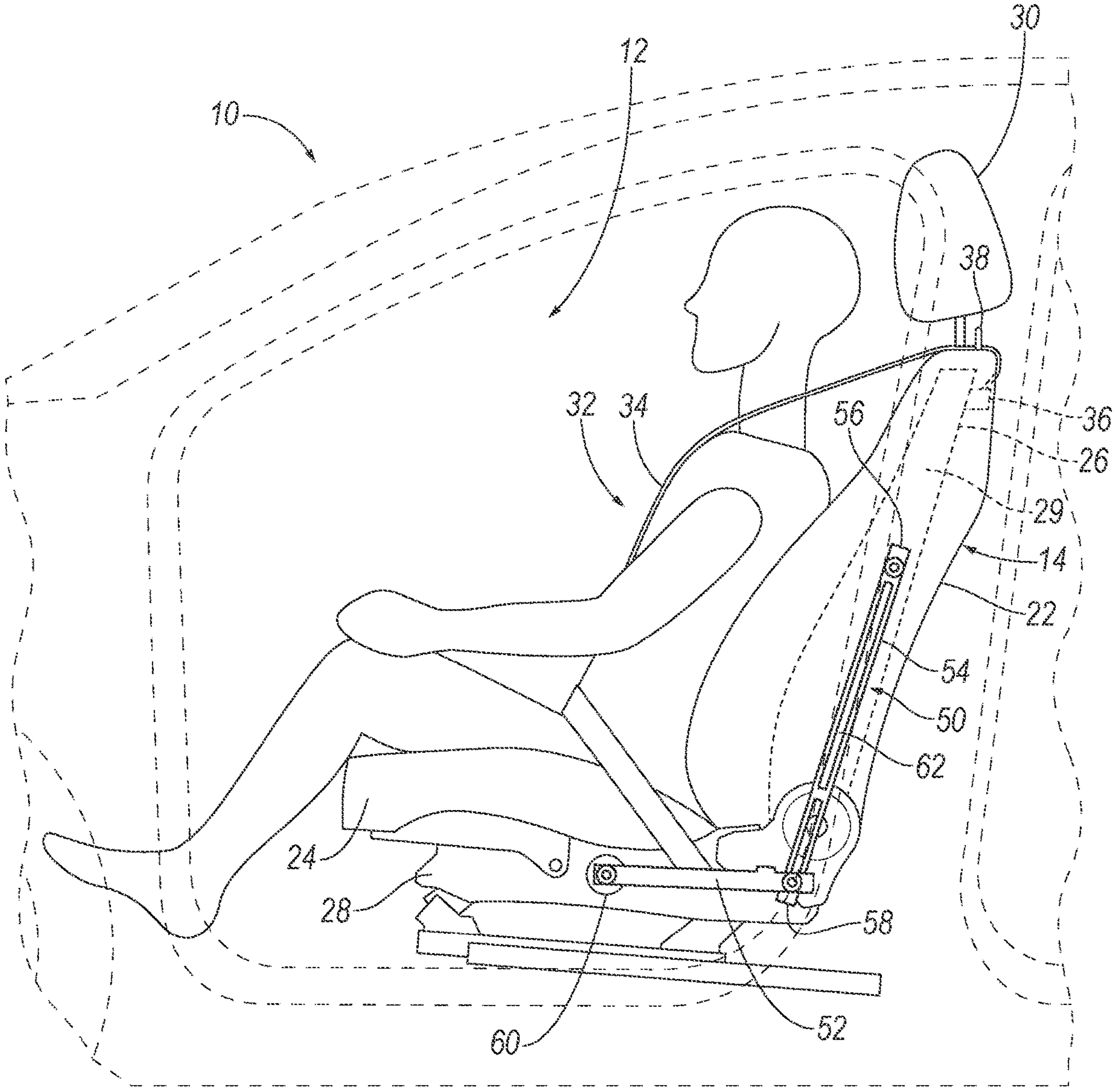
FIG. 1 is a side view of a portion of a vehicle including a seat having a deployable seat frame brace.

A seat system includes a seat including a seat bottom having a seat bottom frame and a seatback having a seatback frame pivotably supported by the seat bottom frame. A seat frame brace is movable between a stowed configuration and a deployed configuration. The seat frame brace includes a bottom link coupled to the seat bottom frame and a back link coupled to the seatback frame at a first end and coupled to the bottom link at a second end. An actuator is coupled to the seat frame brace and operative to move the seat frame brace from the stowed configuration to the deployed configuration.

The actuator can be coupled between the seat bottom frame and the bottom link. The actuator can be a rotary actuator.

The system can include an airbag mounted to the back link.

The back link and the bottom link can be pivotably and slidingly coupled to each other. The system can include a latch operative to lock the back link and the bottom link in position upon reaching the deployed configuration. The back link can include a slot and the bottom link carries a spring-loaded pin slidable along the slot and positioned to engage a latch on the back link when the brace is in the deployed configuration. The back link can include a slot and the bottom link is slidable along the slot and is operable to engage a latch on the back link when the brace is in the deployed configuration.

The system can include a web guide mounted on the seatback frame. The seat frame brace can be mounted to the seat frame on the same side of the seat as the web guide.

The bottom link and the back link can be angled with respect to each other in the stowed configuration and colinear in the deployed configuration.

The system can include one or more processors and one or more memory devices storing instructions executable by the one or more processors to activate the actuator in response to certain vehicle impacts in order to move the seat frame brace to the deployed configuration and resist forward movement of the seatback relative to the seat bottom.

The instructions can include instructions to activate an airbag mounted on the back link in response to certain vehicle impacts.

The actuator can be coupled between the seat bottom frame and the bottom link. The system can include a latch operative to lock the back link and the bottom link in position upon reaching the deployed configuration. The actuator can be a solenoid device. The actuator can be a pyrotechnic device.

The system can include a seatbelt assembly supported by the seat. An anchor of the seatbelt assembly can be positioned between the seat bottom frame and the seat frame brace.

With reference to the figures, where like numerals indicate like features throughout the several views, an example of a seat system having a deployable seat frame brace 50 can include a seat 14 with a seat bottom 24 having a seat bottom frame 28 and a seatback 22 having a seatback frame 26 pivotably supported by the seat bottom frame 28. The seat frame brace 50 is movable between a stowed configuration (FIG. 1) and a deployed configuration (FIG. 2). The seat frame brace includes a bottom link 52 coupled to the seat bottom frame 28 and a back link 54 coupled to the seatback frame 26 at a first end 56 and coupled to the bottom link at a second end 58. An actuator 60 is coupled to the seat frame brace 50 and is operative to move the seat frame brace 50 from the stowed configuration to the deployed configuration, thereby resisting movement of the seatback 22 in a seat-forward direction.

Figure 2:
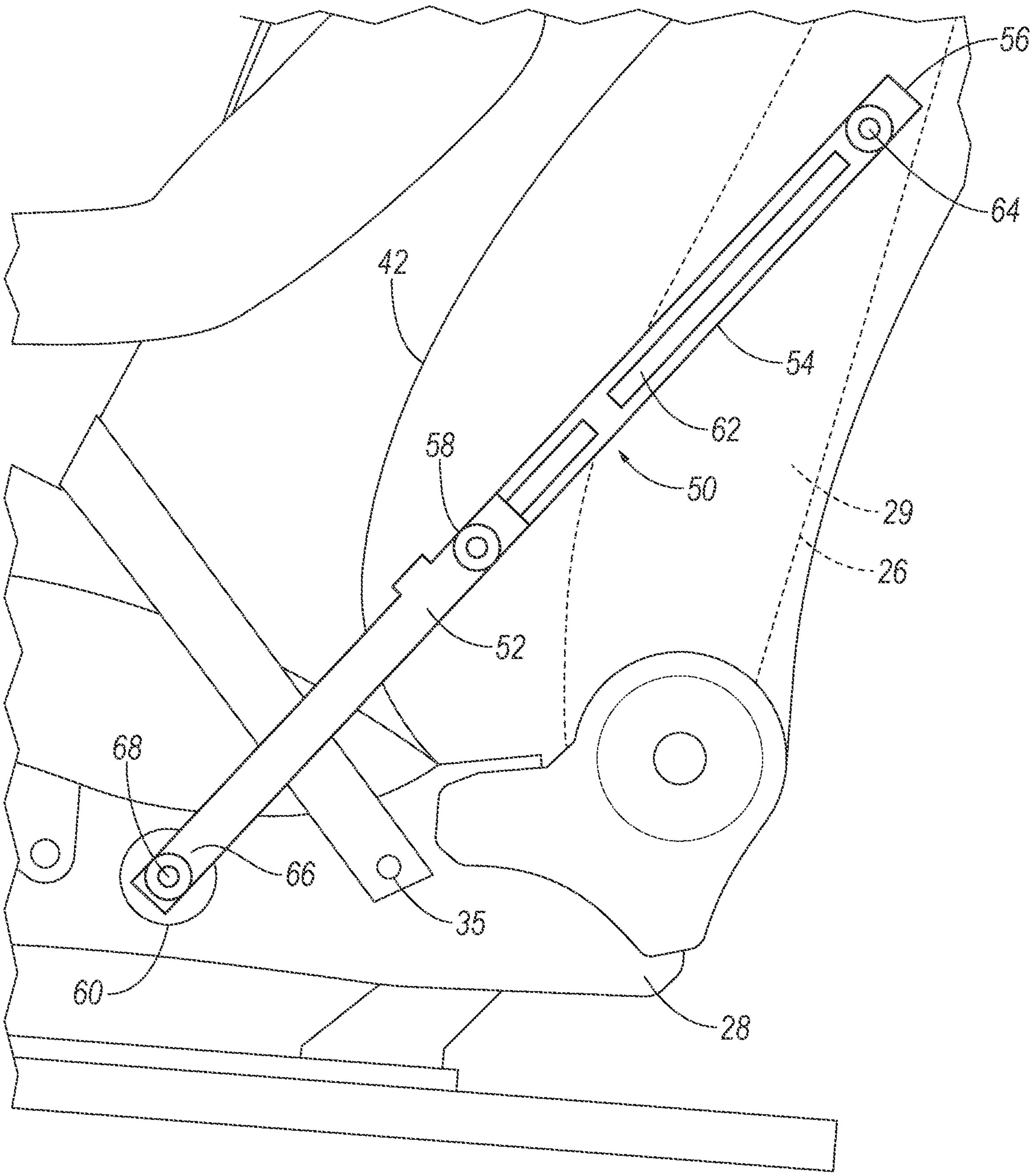
FIG. 2 is an enlarged partial side view of the seat with the seat frame brace in a deployed configuration.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seats, such as seat 14, may be supported in the passenger cabin 12, e.g., by a floor of the vehicle 10. Each seat 14 includes a seatback 22 and a seat bottom 24 that can support the occupant of the seat 14. For example, the occupant of the seat 14 may sit atop a top surface of the seat bottom 24 and recline against the seatback 22. While seat 14 shown in the figures is in the front driver position, the disclosed technology can be applied to any seat in the vehicle.

The seatback 22 may include a seatback frame 26. The seatback frame 26 may include tubes, beams, etc. Specifically, the seatback frame 26 may include a pair of upright frame members 29. The upright frame members 29 are elongated, and specifically, are elongated in a generally upright direction (e.g., along a seat-vertical axis) when the seatback 22 is in a generally upright position. The upright frame members 29 are spaced apart from each other in a cross-vehicle direction. The seatback frame 26 may include one or more cross-members extending between the upright frame members 29.

The seat bottom 24 has a front end and a rear end. The front end is seat-forward of the rear end in the seat-forward direction. The seat bottom 24 can include a seat bottom frame 28. The frame 28 may include tubes, beams, etc. Specifically, the seat bottom frame 28 may include a pair of frame members elongated in the seat-forward direction, e.g., between the front end and the rear end of the seat bottom 24. The seat bottom frame 28 may include cross-members extending between the frame members. The seat bottom frame 28 can include a seat pan. The seat pan may be generally planar and extend from one of the frame members to the other of the frame members. The seat pan may be fixed to the frame members.

The seatback frame 26 and the seat bottom frame 28 may be of any suitable plastic material, e.g., carbon fiber reinforced plastic (CFRP), glass fiber-reinforced semi-finished thermoplastic composite (organosheet), etc. As another example, some or all components of the seatback frame 26 and the seat bottom frame 28 may be formed of a suitable metal, e.g., steel, aluminum, etc. The seatback 22 and the seat bottom 24 can include suitable covers. The covers may include upholstery and padding. The upholstery may be cloth, leather, faux leather, or any other suitable material. The upholstery may be stitched in panels around the frames. The padding may be between the upholstery and the frames. The padding may be foam or any other suitable material.

The seatback 22 is supported by the seat bottom 24 at the rear end. The seat bottom 24 extends from the seatback 22 in the seat-forward direction of the seat 14. The rear end is proximate to the seatback 22 and the front end is distal from the seatback 22. The seatback 22 may be stationary or movable relative to the seat bottom 24. In an example, the seatback 22 is pivotably supported by the seat bottom 24 and may be selectively pivotable to a desired position by an occupant of the seat 14. In such an example, the seatback 22 is pivotable with respect to the seat bottom 24 about a pivot axis. The seatback 22 and the seat bottom 24 may be adjustable in multiple degrees of freedom. Specifically, the seatback 22 and the seat bottom 24 may themselves be adjustable, in other words, adjustable components within the seatback 22 and/or the seat bottom 24, and/or may be adjustable relative to each other. The seatback 22 may be selectively pivotable about the pivot axis and selectively locked in position relative to the pivot axis with any suitable mechanism, including mechanical and/or electronic components, and in some examples, including currently known mechanisms.

The seat 14 may include a head restraint 30. The head restraint 30 may be supported by the seatback 22. The head restraint 30 may be at a top end of the seatback 22. The head restraint 30 may be stationary or movable relative to the seatback 22. The seatback 22 and the head restraint 30 may be adjustable in multiple degrees of freedom. Specifically, the seatback 22 and/or the head restraint 30 may themselves be adjustable and/or may be adjustable relative to each other.

A seatbelt assembly 32 is associated with each seat 14. The seatbelt assembly 32 can include a retractor 36 and a webbing 34. The webbing 34 is retractably payable from the retractor 36. The seatbelt assembly 32 may include an anchor 35 (FIG. 2) fixed to the webbing 34 and a latch plate (not visible) that engages a buckle (not visible). The webbing 34 may extend continuously from the retractor 36 through a webbing guide 38 and to the anchor 35. The latch plate may slide freely along the webbing 34, and when engaged with the buckle, divide the webbing 34 into a lap belt and a shoulder belt. The webbing 34 may be fabric, e.g., polyester.

The seatbelt assembly 32 may be a seat-integrated restraint (SIR) in which various components of the seatbelt assembly 32, e.g., the retractor 36 and the webbing guide 38, are carried by the seatback frame 26. For example, the frame of the retractor 36 may be fixed to the frame 26 of the seatback 22 via weld, fastener, or other suitable structure. The retractor 36 may be supported by the seatback 22 at the top end as shown. It is contemplated that future regulatory and technology evolution may allow for safe and permissible use of seats that are selectively rotatable to different facing positions, and in such examples, the seatbelt assembly 32 may be a SIR.

As a result of certain vehicle impacts, the occupant can pull against the webbing 34, which is attached to the seatback 22, via the webbing guide 38 and the retractor 36, applying forces to the seatback 22 that tend to pivot and twist the seatback 22 in a seat-forward direction with respect to the seat bottom 24. In response to certain vehicle impacts the seat frame brace 50 moves from the stowed configuration to the deployed configuration, thereby resisting movement of the seatback 22 in the seat-forward direction. In an example, the seat frame brace 50 can be mounted to the seat frame 26 and 28 on the same side of the seat 14 as the webbing guide 38.

With reference to FIG. 2, The seat frame brace 50 is movable between the stowed configuration (FIG. 1) and a deployed configuration (FIG. 2). The seat frame brace includes a bottom link 52 coupled to the seat bottom frame 28 and a back link 54 coupled to the seatback frame 26 at a first end 56 and coupled to the bottom link 52 at a second end 58. An actuator 60 is coupled to the seat frame brace 50 and is operative to move the seat frame brace 50 from the stowed configuration to the deployed configuration, thereby resisting movement of the seatback 22 in a seat-forward direction. The bottom link 52 and the back link 54 are angled with respect to each other in the stowed configuration and colinear in the deployed configuration. In an example, the seat frame brace 50, i.e., bottom link 52 and back link 54, can have a compressive and/or bending strength greater than the forces against the seatback 22 that are expected in certain vehicle impacts.

The first end 56 of the back link 54 can be pivotably mounted to the upright frame member 29 with any suitable hardware, such as shoulder screw 64. A first end 66 of the bottom link 52 can be pivotably mounted to the seat bottom frame 28 with any suitable hardware, such as shoulder screw 68. In an example, the actuator 60 can be a rotary actuator positioned e.g., between the bottom link 52 and the seat bottom frame 28. The bottom link 52 can be carried by the shoulder screw 68 and/or the actuator 60. In another example, the actuator can be a linear actuator (not shown) mounted between the bottom link 52 and the seat bottom frame 28. The actuator 60 can be a solenoid device, a pyrotechnic device, or other suitable actuator. In some examples, the actuator 60 can be mounted between the back link 54 and the seat back frame 26.

In some examples, the seat frame brace 50 can carry a side airbag module 62 mounted to the back link 54, for example. The airbag module 62 can include an inflator or the inflator can be mounted remotely. The seat frame brace 50 and the airbag module 62 may be concealed by a covering 42, e.g., the upholstery of the seat bottom 24 and the seatback 22. In other words, the seat frame brace 50 and the airbag module 62 may be between the frames 26 and 28 of the seat 14 and the upholstery 42 of the seat 14. The covering 42 may include a tear seam (not numbered) associated with the seat frame brace 50 and/or the airbag module 62. The seat frame brace 50 and/or the airbag 62 may extend through the tear seam as they are deployed. The tear seam may be designed to tear apart when subjected to a tensile force above a threshold magnitude. In other words, the covering 42 on one side of the tear seam separates from the covering 42 on the other side of the tear seam when the force is above the threshold magnitude. The threshold magnitude may be chosen to be greater than forces from, e.g., inadvertent pushing against the seat by an occupant but be less than forces from the deployment of the seat frame brace 50 and/or the airbag 62. The tear seam may be, for example, a line of perforations through the covering 42, a line of thinner covering material than the rest of the covering 42, etc.

Figure 3:
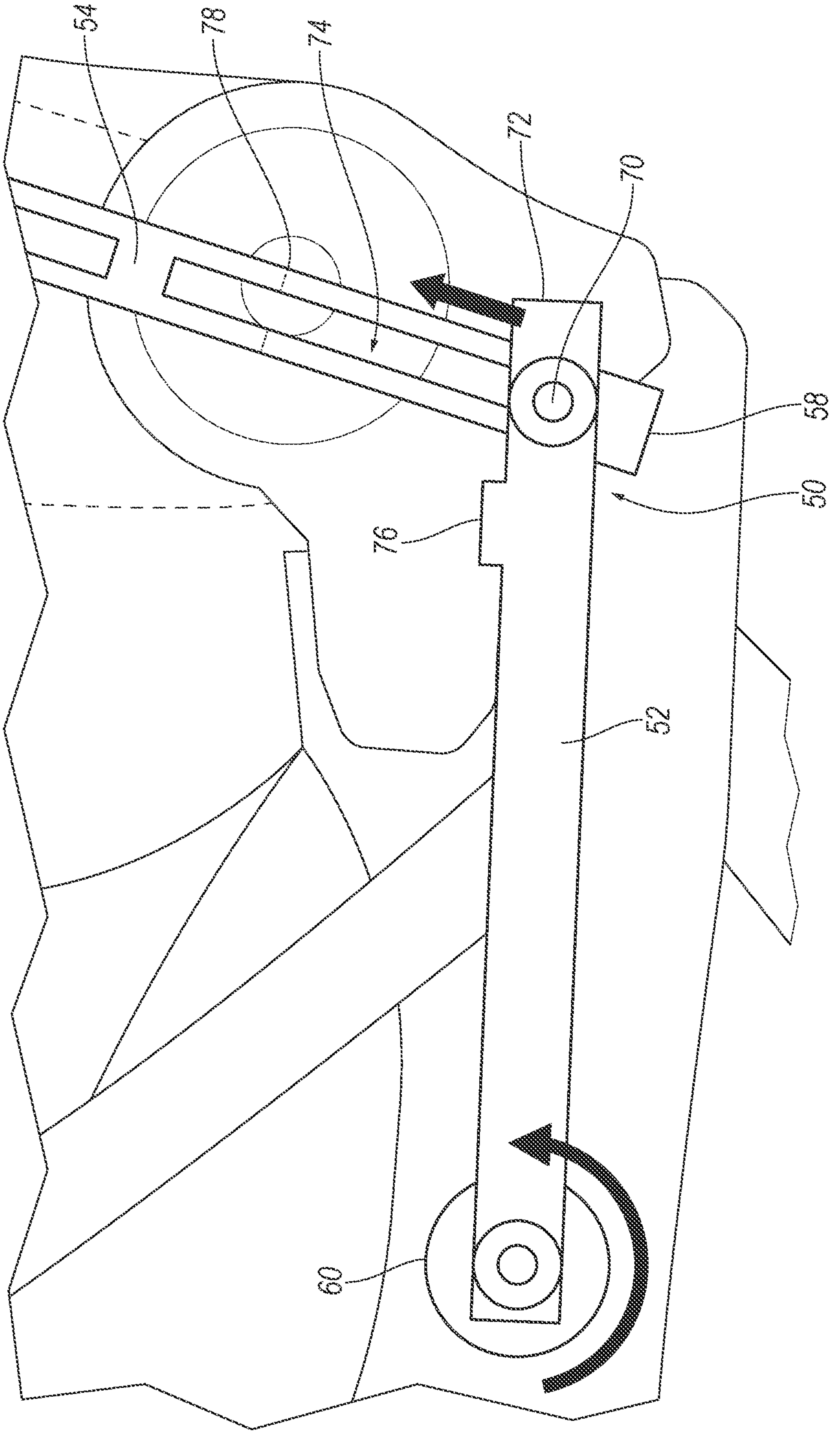
FIG. 3 is an enlarged partial side view of the deployable seat frame brace in a stowed configuration.

The seat frame brace 50 includes a lock between the bottom link 52 and the back link 54 that locks the bottom link 52 and the back link 54 relative to each other in the deployed configuration. Specifically, the lock prevents axial sliding between the bottom link 52 and the back link 54 to lock the bottom link 52 and the back link 54 in the deployed configuration after the bottom link 52 and the back link 54 move from the stowed configuration to the deployed configuration. As an example, as shown in FIG. 3, the lock may be a spring-loaded pin 70 between the bottom link 52 and the back link 54. As an example, the back link 54 includes a slot 74 and a second end 72 of the bottom link 52 carries a spring-loaded pin 70 that is slidable along the slot 74. Thus, the back link 54 and the bottom link 52 are pivotably and slidingly coupled to each other. The spring-loaded pin 70 is positioned to engage a latch 78 on the back link 54 when the brace 50 is in the deployed configuration. The latch 78 is operative to lock the back link 54 and the bottom link 52 in position upon reaching the deployed configuration. As the actuator 60 rotates the bottom link 52 counter-clockwise, the pin 70 slides along the slot 74 causing the back link 54 to rotate clockwise until the two links latch in the deployed configuration. The actuator 60 can include an internal rotation limiter or end stop. Also, once the links rotate to the deployed colinear configuration, a stop tab 76 abuts the back link 54 preventing the links from rotating past the colinear configuration.

Because the bottom link 52 and the back link 54 are pivotably and slidingly coupled together, the seat frame brace 50 can accommodate movement between the seatback 22 and the seat bottom 24 while in the stowed configuration. In other words, as the seatback 22 is pivoted forward or backward (i.e., reclined) with respect to the seat bottom 24, the back link 54 can rotate and if necessary, slide with respect to the bottom link 52.

Figures 4A, 4B, 4C:
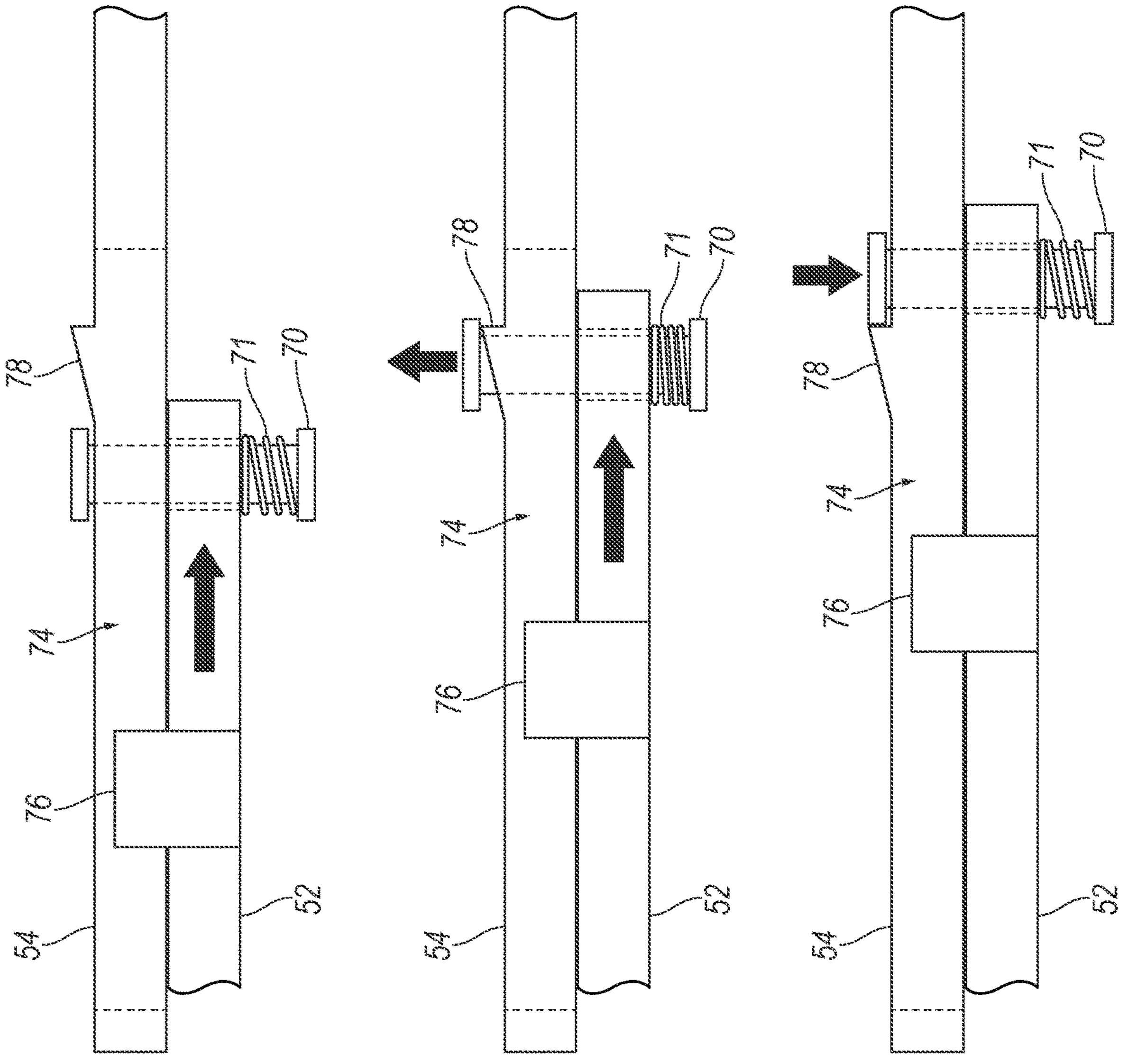
FIG. 4A is a top view of a latch mechanism in an unlatched state.
FIG. 4B is a top view of a partially engaged latch mechanism.
FIG. 4C is a top view of a latch mechanism in a latched state.

As shown in FIG. 4A, the pin 70 can be biased against the back link 54 with a resilient member, such as compression spring 71. As the pin 70 slides along slot 74 the head of pin 70 slides up ramped surfaces of latch 78 while compressing spring 71 (FIG. 4B). Once the pin 70 moves past the latch 78, the head of pin 70 drops behind the latch 78 to lock the pin 70 in position at the end of the slot 74 (FIG. 4C). In an example, the latch can include multiple locking positions by having multiple latches 78 in a ratchet arrangement.

Figure 5:
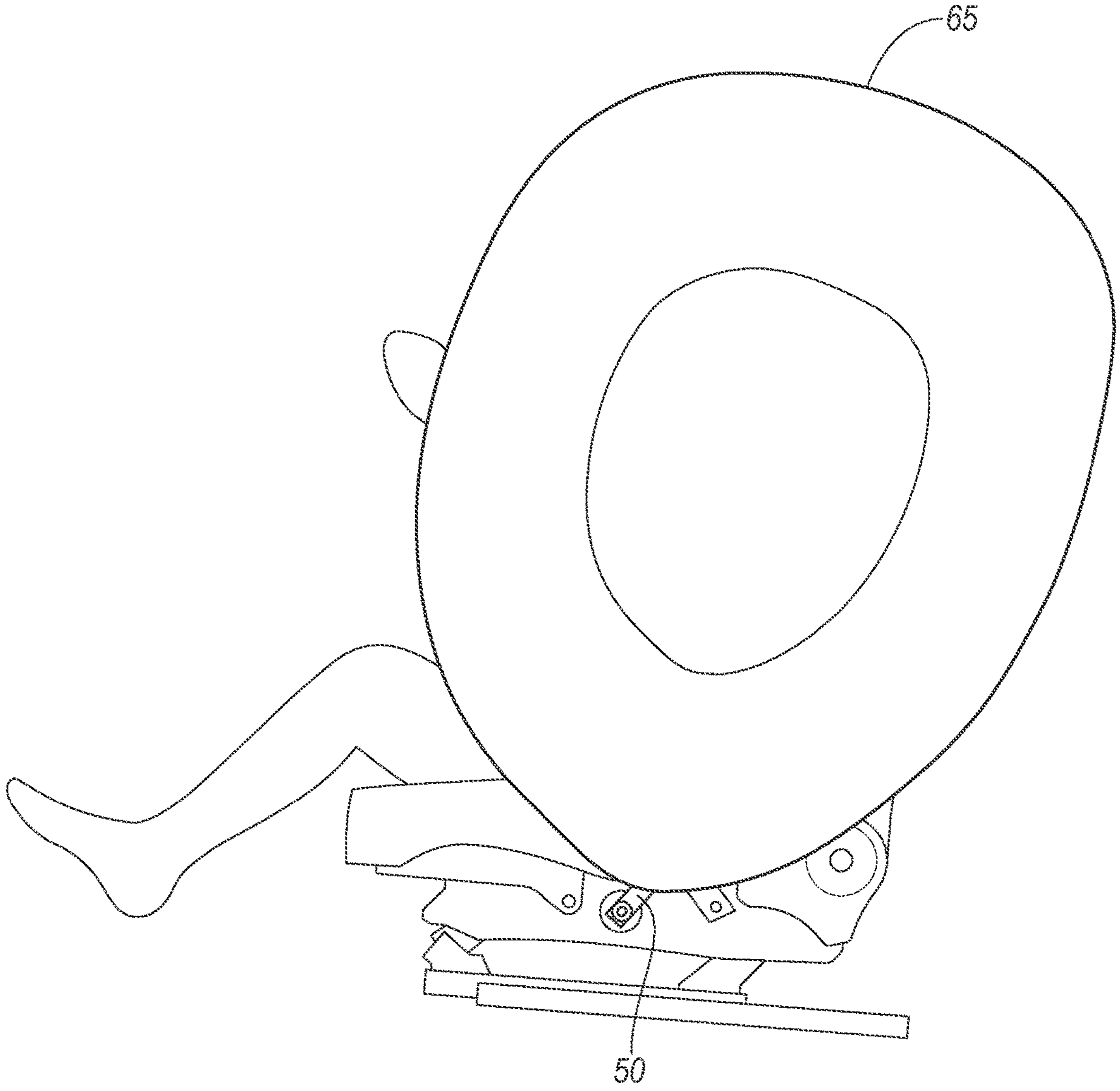
FIG. 5 is a side view of the seat illustrating an airbag deployed from the seat frame brace.

With reference to FIG. 5, the airbag module 62 includes an airbag 65 that can be deployed (i.e., inflated) when the seat brace 50 is in the stowed configuration or the deployed configuration. The airbag 65 may be deployed separately from the seat frame brace 50. For example, in response to certain vehicle impacts to the side of the vehicle, only the airbag 65 is deployed without deploying the seat frame brace 50. In another example, in response to certain vehicle impacts to the front of the vehicle, only the seat frame brace 50 is deployed. In some examples, both the seat frame brace 50 and the airbag 65 are deployed in response to certain vehicle impacts to the side of the vehicle. In some examples, both the seat frame brace 50 and the airbag 65 are deployed in response to certain vehicle impacts to the front of the vehicle.

Figure 6:
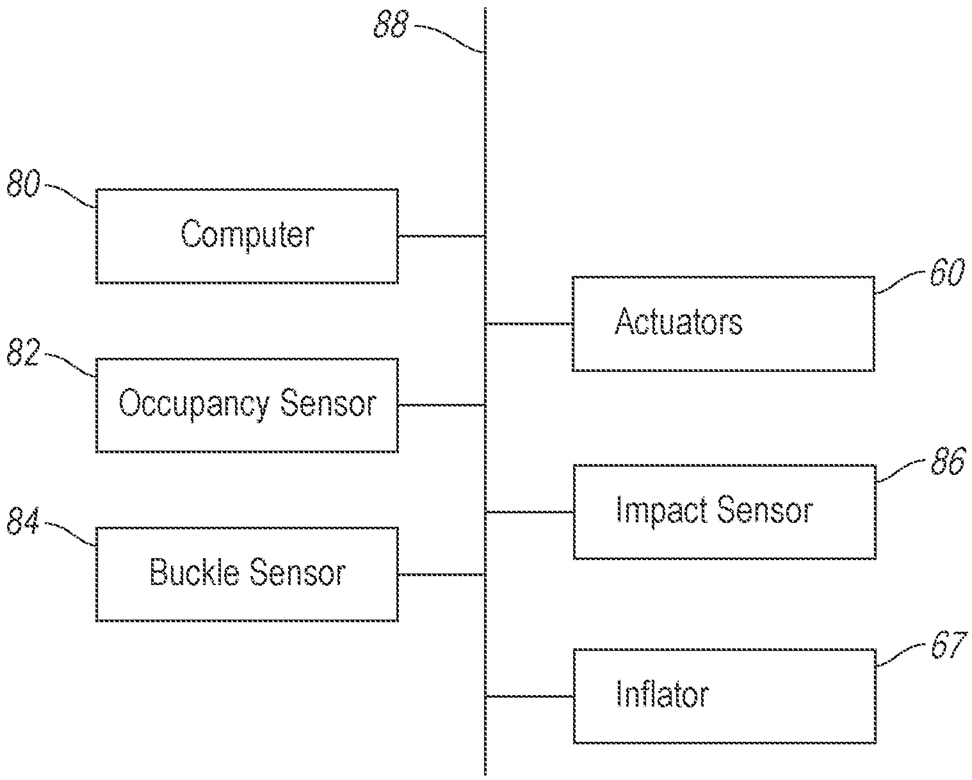
FIG. 6 is a block diagram of a system of the vehicle.

With reference to FIG. 6, a seat system can include a seat 14 and the deployable seat frame brace 50, as well as a computer 80, a network 88, and various sensors, including an occupancy sensor 82, a buckle sensor 84, and an impact sensor 86. The vehicle 10 may include an occupancy sensor 82 configured to detect occupancy of the seat 14. The occupancy sensor 82 may include visible-light or infrared cameras directed at the seat, weight sensors supported by the seat bottom 24, or other suitable structure, including those conventionally known. The occupancy sensor 82 provides data to the computer 80 indicating whether the seat 14 is occupied or unoccupied.

The vehicle 10 may include a buckle sensor 84 that detects engagement of the latch plate of the seatbelt assembly 32 with the buckle. The buckle sensor 84 may include a switch, a contact sensor, a hall effect sensor, or any other suitable structure for detecting engagement of the latch plate with the buckle, including conventional structures. The buckle sensor 84 provides data to the computer 80 indicating whether the latch plate is engaged with, or disengaged from, the buckle.

The vehicle 10 may include at least one impact sensor 86 for sensing certain vehicle impacts (e.g., impacts of a certain magnitude, direction, etc.). The vehicle computer 80 may activate the actuator 60, e.g., provide power to a solenoid or an impulse to a pyrotechnic charge, when the impact sensor 86 senses certain vehicle impacts. Alternatively or additionally to sensing certain vehicle impacts, the impact sensor 86 may be configured to sense certain vehicle impacts prior to impact, i.e., pre-impact sensing.

The impact sensor 86 is configured to detect certain vehicle impacts. In other words, a "certain vehicle impact" is an impact of the type and/or magnitude for which activation of the seat frame brace 50 and/or airbag 62 is designed i.e., "certain" indicates the type and/or magnitude of the impact. The type and/or magnitude of such "certain vehicle impacts" may be pre-stored in the computer 80, e.g., a restraints control module and/or a body control module. The impact sensor 86 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 86 may be located at numerous points in or on the vehicle 10.

The vehicle 10 may include a communication network 88. The communication network 88 includes hardware, such as a communication bus, for facilitating communication among vehicle components, e.g., the computer 80, the occupancy sensor 82, the buckle sensor 84, the impact sensor 86, the actuators 60, an inflator 67, etc. The communication network 88 may facilitate wired or wireless communication among the vehicle components in accordance with a number of communication protocols such as controller area network (CAN), Ethernet, Wi-Fi, Local Interconnect Network (LIN), and/or other wired or wireless mechanisms. Alternatively or additionally, in cases where the computer 80 comprises a plurality of devices, the communication network 88 may be used for communications between devices represented as the computer 80 in this disclosure.

The computer 80 may be a microprocessor-based computer implemented via circuits, chips, or other electronic components. The computer 80 includes a processor, a memory, etc. The memory of the computer 80 may include memory for storing programming instructions executable by the processor as well as for electronically storing data and/or databases. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

The computer 80 is programmed to, i.e., the memory stores instructions executable by the processor to, command the actuator 60 to e.g., rotate the bottom link 52 counterclockwise to move the seat frame brace 50 to the deployed configuration. The computer 80 may deploy the seat frame brace 50 by providing power to a solenoid or an impulse to a pyrotechnic charge via the communication network 88. The computer 80 may inflate the airbag 65 to the inflated position by sending a signal to the inflator 67 to move the airbag 65 to the deployed/inflated position. The computer 80 may be programmed to deploy the seat frame brace 50 and/or the airbag 65 in response to detecting certain vehicle impacts. The computer 80 may determine that a certain vehicle impact has occurred or may occur based on information received from the impact sensor 86 via the communication network 88.

The computer 80 may determine that the seat 14 is occupied based on information received from the occupancy sensor 82 via the communication network 88. In an example, the computer 80 may be programmed to deploy the seat frame brace 50 and/or the airbag 65 in response to detecting certain vehicle impacts and when the computer 80 has determined that the seat 14 is occupied.

The computer 80 may determine that the latch plate of the seatbelt assembly 32 is engaged with the buckle based on information received from the buckle sensor 84 via the communication network 88. In an example, the computer 80 may be programmed to deploy the seat frame brace 50 and/or the airbag 65 in response to detecting certain vehicle impacts and when the computer 80 has determined that the latch plate is engaged with the buckle.

The computer 80 may determine that the seat 14 is occupied and that the latch plate of the seatbelt assembly 32 is engaged with the buckle. In another example, the computer 80 may be programmed to deploy the seat frame brace 50 and/or the airbag 65 in response to detecting certain vehicle impacts and when the computer 80 has determined that the seat 14 is occupied and the latch plate is engaged with the buckle.

Computing devices, such as the computer 80, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The adverb “approximately” modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

The numerical adjectives first, second, etc., are used throughout this document as identifiers and do not signify importance, order, or quantity.

Use of in “response to,” “based on,” and “upon determining” herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat system, comprising:

a seat bottom having a seat bottom frame and a seatback having a seatback frame pivotably supported by the seat bottom frame;

a seat frame brace movable between a stowed configuration and a deployed configuration, the seat frame brace including:

a bottom link pivotably mounted to the seat bottom frame; and a back link pivotably mounted to the seatback frame at a first end, and the back link being pivotably and slidingly coupled to the bottom link at a second end; and a lock between the bottom link and the back link, the lock being carried by the bottom link between the stowed configuration and the deployed configuration, the lock being operative to lock the back link and the bottom link in the deployed configuration; and an actuator between the bottom link and the seat bottom frame and operative to move the seat frame brace from the stowed configuration to the deployed configuration.

2. The system of claim 1, wherein the actuator is a rotary actuator.

3. The system of claim 1, further comprising an airbag mounted to the back link.

4. The system of claim 1, wherein the back link includes a slot and a latch, the lock including a spring-loaded pin slidable along the slot and positioned to engage the latch on the back link when the brace is in the deployed configuration.

5. The system of claim 4, wherein:

the back link includes a slot and a latch having a ramped surface;

the lock includes a pin extending through the bottom link and the slot of the back link, the pin including a head movable along the ramped surface; and a spring compressed by the pin during movement of the head along the ramped surface.

6. The system of claim 1, wherein the back link includes a slot and a latch, and the bottom link is slidable along the slot and is operable to engage the latch on the back link when the brace is in the deployed configuration.

7. The system of claim 1, further comprising a web guide mounted on the seatback frame.

8. The system of claim 7, wherein the seat frame brace is mounted to the seat frame on the same side of the seat as the web guide.

9. The system of claim 1, wherein the bottom link and the back link are angled with respect to each other in the stowed configuration and colinear in the deployed configuration.

10. The system of claim 9, wherein a stop tab abuts the back link to prevent the back link and the bottom link in a position colinear with each other in the deployed position.

11. The system of claim 1, further comprising one or more processors and one or more memory devices storing instructions executable by the one or more processors to activate the actuator in response to certain vehicle impacts in order to move the seat frame brace to the deployed configuration and resist forward movement of the seatback relative to the seat bottom.

12. The system of claim 11, wherein the instructions include instructions to activate an airbag mounted on the back link in response to certain vehicle impacts.

13. The system of claim 1, wherein the actuator is a solenoid device.

14. The system of claim 1, wherein the actuator is a pyrotechnic device.

15. The system of claim 1, further comprising a seatbelt assembly supported by the seat.

16. The system of claim 15, wherein an anchor of the seatbelt assembly is positioned between the seat bottom frame and the seat frame brace.

* * * * *